US012491540B2

(12) United States Patent
Fu et al.

(10) Patent No.: US 12,491,540 B2
(45) Date of Patent: Dec. 9, 2025

(54) HANDHELD CLEANING MACHINE

(71) Applicant: ZHEJIANG QIANJI INTELLIGENT TECHNOLOGY CO., LTD., Zhejiang (CN)

(72) Inventors: Keke Fu, Jinhua (CN); Jin Li, Jinhua (CN)

(73) Assignee: ZHEJIANG QIANJI INTELLIGENT TECHNOLOGY CO., LTD., Zhejiang (CN)

( * ) Notice: Subject to any disclaimer, the term of this patent is extended or adjusted under 35 U.S.C. 154(b) by 146 days.

(21) Appl. No.: 18/580,484

(22) PCT Filed: Jul. 15, 2022

(86) PCT No.: PCT/CN2022/106012

§ 371 (c)(1),
(2) Date: Jan. 18, 2024

(87) PCT Pub. No.: WO2023/001074

PCT Pub. Date: Jan. 26, 2023

(65) Prior Publication Data

US 2025/0073759 A1 Mar. 6, 2025

(30) Foreign Application Priority Data

Jul. 19, 2021 (CN) ........................ 202110814890.X

(51) Int. Cl.
*B08B 3/02* (2006.01)
*B05B 7/02* (2006.01)
(Continued)

(52) U.S. Cl.
CPC ................ *B08B 3/026* (2013.01); *B05B 7/02* (2013.01); *F04B 19/04* (2013.01); *F04B 19/22* (2013.01);
(Continued)

(58) Field of Classification Search
CPC ...................................................... B08B 3/026
See application file for complete search history.

(56) References Cited

FOREIGN PATENT DOCUMENTS

| | | | |
|---|---|---|---|
| CN | 205570600 U | 9/2016 | |
| CN | 106593801 A | 4/2017 | |

(Continued)

OTHER PUBLICATIONS

International Search Report and Written Opinion (with English translation) received in corresponding Application No. PCT/CN2022/106012, dated Oct. 12, 2022, 16 pages.

(Continued)

*Primary Examiner* — Jason Y Ko
(74) *Attorney, Agent, or Firm* — Dority & Manning, PA

(57) ABSTRACT

A handheld cleaning machine, comprising: a housing, a reciprocating mechanism, a driving assembly, and a water pump assembly. The reciprocating mechanism comprises a reciprocating shaft, a sleeve, and a first guide assembly. The driving assembly is configured to drive the reciprocating shaft to rotate, so that the sleeve reciprocates in the length direction of the reciprocating shaft; the water pump assembly comprises a water inlet member, a pump body, and a water outlet member, the pump body is connected to the sleeve, the pump body is communicated between the water inlet member and the water outlet member, and when the pump body moves along the axis of the reciprocating shaft, the pump body is configured to feed water from the water inlet member and discharge water from the water outlet member.

10 Claims, 4 Drawing Sheets

(51) Int. Cl.
*F04B 19/04* (2006.01)
*F04B 19/22* (2006.01)
*F04B 53/10* (2006.01)

(52) U.S. Cl.
CPC ...... *F04B 53/10* (2013.01); *B08B 2203/0205* (2013.01); *B08B 2203/027* (2013.01)

(56) References Cited

FOREIGN PATENT DOCUMENTS

| | | | |
|---|---|---|---|
| CN | 110905750 | A | 3/2020 |
| CN | 211160307 | U | 8/2020 |
| CN | 113374683 | A | 9/2021 |
| CN | 215927742 | U | 3/2022 |
| KR | 20060119724 | A | 11/2006 |
| KR | 20180120944 | A | 11/2018 |

OTHER PUBLICATIONS

Decision of Refusal (with English translation) received in corresponding Application No. CN 202110814890.X, dated Apr. 29, 2023, 16 pages.

Office Action (with English translation) received in corresponding Application No. CN 202110814890.X, dated Aug. 30, 2022, 15 pages.

Office Action (with English translation) received in corresponding Application No. CN 202110814890.X, dated Feb. 3, 2023, 12 pages.

HANDHELD CLEANING MACHINE

CROSS REFERENCE TO RELATED APPLICATIONS

This application is an U.S. national phase application under 35 U.S.C. § 371 based upon international patent application No. PCT/CN2022/106012, filed on Jul. 15, 2022, which itself claims priority to Chinese patent application No. 202110814890.X filed on Jul. 19, 2021. The contents of the above identified applications are hereby incorporated herein in their entireties by reference.

TECHNICAL FIELD

The present disclosure relates to the technical field of cleaning tools, in particular to a hand-held cleaning device.

BACKGROUND

With the development of cleaning tool technology, a hand-held cleaning device technology appears. The hand-held cleaning device is a kind of cleaning equipment that uses water pressure to clean dirt, oil, sediment, etc., on surfaces of objects. Since the hand-held cleaning device is handheld and easy to carry, which can meet the cleaning requirements of outdoor activities, the hand-held cleaning device is widely used.

In the conventional technology, the hand-held cleaning device uses a motor to drive a reduction gearbox to drive an eccentric mechanism to form reciprocating movement, and drives a single plunger to reciprocate in a pump body to perform work on water to form water absorption and water discharge, so as to spray water at high pressure and form a cleaning effect on the dirt.

However, in current hand-held cleaning device, when an eccentric mechanism drives the single plunger to reciprocate in the pump body, there is a large eccentric force, so that a pressing plunger slides and rubs in the pump body, the transmission efficiency is not high, the overall working efficiency is low, and the loss is large.

SUMMARY

Accordingly, it is necessary to provide a hand-held cleaning device, which can effectively improve the transmission efficiency, improve the working efficiency of the pump body, thereby improving the cleaning effect of the cleaning device.

A hand-held cleaning device includes: a housing provided with a mounting cavity; a reciprocating mechanism provided in the mounting cavity, the reciprocating mechanism including a reciprocating shaft, a sleeve, and a first guiding assembly, wherein the sleeve is sleeved on the reciprocating shaft, the reciprocating shaft is provided with a guiding portion, and the sleeve is in guiding engagement with the guiding portion through the first guiding assembly; a driving assembly provided in the mounting cavity, the drive assembly being in driving connection with the reciprocating shaft and configured to drive the reciprocating shaft to rotate, so as to enable the sleeve to reciprocate along an axial direction of the reciprocating shaft; and a water pump assembly including a water inlet member, a pump body, and a water outlet member, wherein the pump body is connected to the sleeve, the pump body is in communication between the water inlet member and the water outlet member, when the pump body moves along an axis of the reciprocating shaft, the pump body is configured to suck water from the water inlet member and discharge the water from the water outlet member.

During use of the hand-held cleaning device, firstly, a water pipe or a water tank is in communication with the water inlet member, then, the driving assembly is operated to drive the reciprocating shaft to rotate. Since the first guiding assembly is in guiding engagement with the guiding portion of the reciprocating shaft, and the sleeve is connected to the first guiding assembly, the sleeve reciprocates along the length direction of the reciprocating shaft under the rotation of the reciprocating shaft. Since the pump body is connected to the sleeve, the pump body performs a piston reciprocating movement in the water pump assembly to suck water from the water inlet member and discharges water from the water outlet member. According to the hand-held cleaning device, an axial rotation of the reciprocating shaft is converted into a reciprocating movement of the sleeve, and a sliding friction in the conventional eccentric mechanism is changed into a rolling friction of the first guiding assembly, which is conducive to reducing the deflection force, reducing the power loss, and improving the transmission efficiency, and further increasing the water pressure and flow rate of the outlet water of the hand-held cleaning device to improve the use experience of the hand-held cleaning device.

In one of the embodiments, the first guiding assembly includes a first rolling member and a connecting base, the first rolling member is connected to the sleeve through the connecting base, and the first rolling member is rollably fitted with the guiding portion.

In one of the embodiments, the guiding portion is a guiding groove extending along a circumferential direction of the reciprocating shaft and extending reciprocally along the axial direction of the reciprocating shaft, and the first rolling member is rollably fitted with the guiding groove.

In one of the embodiments, the reciprocating mechanism further includes a second guiding assembly connected to a cavity wall of the mounting cavity, and the second guiding assembly is in guiding engagement with the sleeve.

In one of the embodiments, the second guiding assembly includes a guiding plate and a second rolling member, the guiding plate is connected to the cavity wall of the mounting cavity, the guiding plate extends along a length direction of the reciprocating shaft, and the sleeve is in guiding engagement with the guiding plate through the second rolling member.

In one of the embodiments, at least two first guiding assemblies are provided, the at least two first guiding assemblies are spaced apart along a circumferential direction of the reciprocating shaft, and the at least two first guiding assemblies are rollably fitted with the guiding portion.

In one of the embodiments, at least two second guiding assemblies are provided, the at least two second guiding assemblies are spaced apart along a circumferential direction of the sleeve, and the at least two second guiding assemblies are rollably fitted with the sleeve.

In one of the embodiments, the pump body includes a plunger, a first check valve, a second check valve, and a pump housing, the plunger is connected to the sleeve, the first check valve is in communication between the plunger and the water inlet member, the second check valve is in communication between the plunger and the water outlet member, and when the plunger reciprocates, the plunger is configured to discharge water from the water inlet member through the first check valve and the second check valve.

In one of the embodiments, the pump body further includes a third check valve and a fourth check valve, the third check valve is in communication between the plunger and the water inlet member, the third check valve is opposite in direction to the first check valve, the fourth check valve is in communication between the plunger and the water outlet member, and the fourth check valve is opposite in direction to the second check valve.

In one of the embodiments, the driving assembly includes a reduction gearbox and a driving member in driving connection with the reduction gearbox, and the reduction gearbox is in transmission connection with the reciprocating shaft.

In one of the embodiments, the driving assembly further includes a transmission member, and the reduction gearbox is in transmission connection with the driving member through the transmission member.

BRIEF DESCRIPTION OF THE DRAWINGS

The drawings constitute a part of the present disclosure and are used to provide a further understanding of the present disclosure. The exemplary embodiments of the present disclosure and their descriptions are used to explain the present disclosure and do not constitute an improper limitation of the present disclosure.

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DESCRIPTION OF REFERENCE SIGNS

Figure 1:
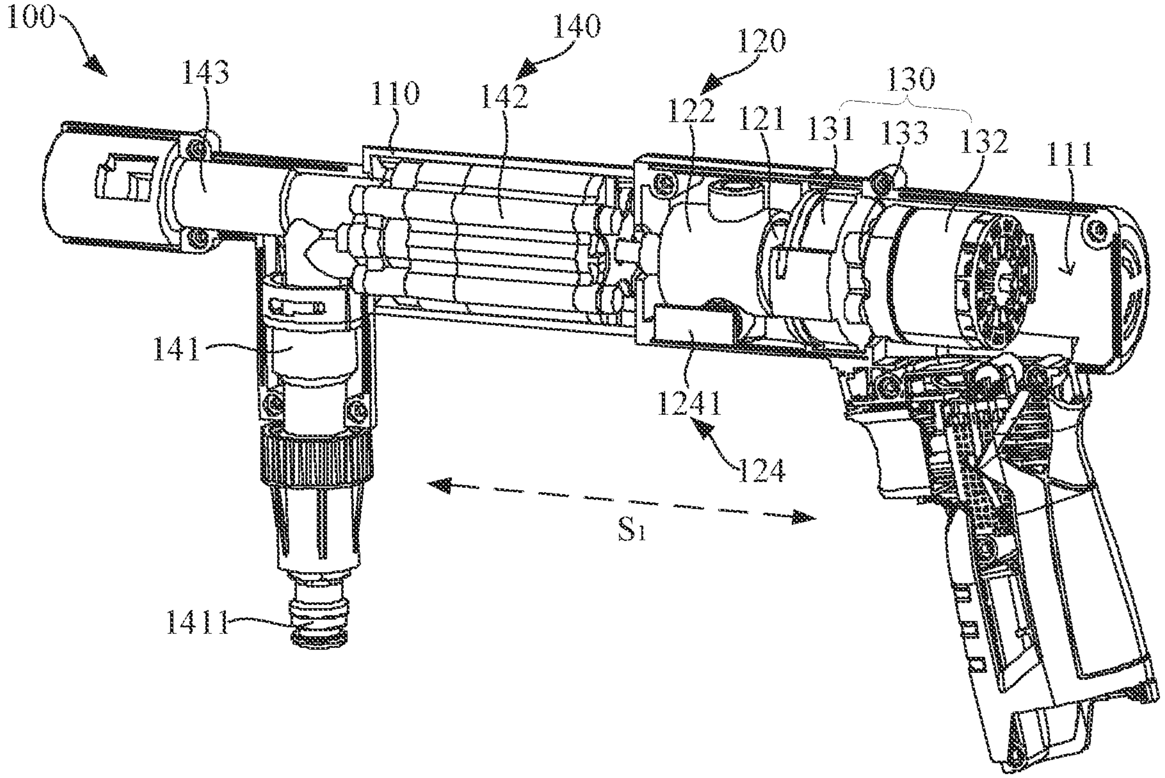
FIG. 1 is a first schematic view showing an internal structure of a hand-held cleaning device according to an embodiment.

100. Hand-held cleaning device; 110. Housing; 111. Mounting cavity; 120. Reciprocating mechanism; 121. Reciprocating shaft; 1211. Guiding portion; 122. Sleeve; 123. First guiding assembly; 1231. First rolling member; 1232. Connecting base; 124. Second guiding assembly; 1241. Guiding plate; 1242. Second rolling member; 130. Driving assembly; 131. Reduction gearbox; 132. Driving member; 133. Transmission member; 140. Water pump assembly; 141. Water inlet member; 1411. Water inlet quick joint; 142. Pump body; 1421. Plunger; 1422. First check valve; 1423. Second check valve; 1424. Pump housing; 1425, Third check valve; 1426, Fourth check valve; 143, Water outlet member.

DETAILED DESCRIPTION OF THE EMBODIMENTS

In order to make the above objects, features and advantages of the present disclosure clear and easier to understand, the specific embodiments of the present disclosure are described in detail below in combination with the accompanying drawings. Many specific details are set forth in the following description to facilitate a full understanding of the present disclosure. However, the present disclosure can be implemented in many ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which are only for the convenience of describing the present disclosure and simplifying the description, rather than indicating or implying that the device or element must have a specific azimuth, be constructed and operated in a specific azimuth, so such terms cannot be understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "a plurality of" means at least two, such as two, three, etc., unless otherwise expressly and specifically defined.

In the present disclosure, unless otherwise expressly specified and limited, the terms "mount", "connect", "contact", "fix" and other terms should be understood in a broad sense, for example, they can be fixed connections, detachable connections, or integrated. They can be mechanical connection or electrical connection. They can be directly connected or indirectly connected through an intermediate medium. They can be the connection within two elements or the interaction relationship between two elements, unless otherwise expressly limited. For those skilled in the art, the specific meaning of the above terms in the present disclosure can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

In an embodiment, referring to FIGS. 1 to 4, a hand-held cleaning device 100 includes a housing 110, a reciprocating mechanism 120, a driving assembly 130, and a water pump assembly 140. The housing 110 is provided with a mounting cavity 111. The reciprocating mechanism 120 is provided in the mounting cavity 111, and includes a reciprocating shaft 121, a sleeve 122, and a first guiding assembly 123. The sleeve 122 is sleeved on the reciprocating shaft 121. The reciprocating shaft 121 is provided with a guiding portion 1211, and the sleeve 122 is in guiding engagement with the guiding portion 1211 through the first guiding assembly 123. The driving assembly 130 is provided in the mounting cavity 111 and is in driving connection with the reciprocating shaft 121. The driving assembly 130 is configured to drive the reciprocating shaft 121 to rotate, so as to enable the sleeve 122 to reciprocate along a length direction of the reciprocating shaft 121. The water pump assembly 140 includes a water inlet member 141, a pump body 142, and a water outlet member 143. The pump body 142 is connected to the sleeve 122, and the pump body 142 is in communication between the water inlet member 141 and the water outlet member 143. The pump body 142 is configured to suck water from the water inlet member 141 and discharge water from the water outlet member 143 while moving along an axis of the reciprocating shaft 121.

During the use of the hand-held cleaning device 100, firstly, a water pipe or a water tank is in communication with the water inlet member 141, then, the driving assembly 130 is operated to drive the reciprocating shaft 121 to rotate. Since the first guiding assembly 123 is in guiding engagement with the guiding portion 1211 of the reciprocating shaft 121, and the sleeve 122 is connected to the first guiding assembly 123, the sleeve 122 reciprocates along the length direction of the reciprocating shaft 121 under the rotation of the reciprocating shaft 121. Since the pump body 142 is connected to the sleeve 122, the pump body 142 performs a piston reciprocating movement in the water pump assembly 140 to suck water from the water inlet member 141 and discharges water from the water outlet member 143. According to the hand-held cleaning device 100, an axial rotation of the reciprocating shaft 121 is converted into a reciprocating movement of the sleeve 122, and a sliding friction in the conventional eccentric mechanism is changed into a rolling friction of the first guiding assembly 123, which is conducive to reducing the deflection force, reducing the power loss, and improving the transmission efficiency, and further increasing the water pressure and flow rate of the outlet water of the hand-held cleaning device 100 to improve the use experience of the hand-held cleaning device 100.

The driving connection between the driving assembly 130 and the reciprocating shaft 121 should be interpreted as that the driving assembly 130 is connected to the reciprocating shaft 121, and the driving assembly 130 acts as power and can drive the reciprocating shaft 121 to rotate.

It should be noted that the guiding engagement between the guiding portion 1211 and the sleeve 122 through the first guiding assembly 123 can be interpreted as that the sleeve 122 abuts against and cooperates with the guiding portion 1211 through the first guiding assembly 123, such as rolling fit, sliding fit, etc. The guiding portion 1211 guides the first guiding assembly 123, so that the first guiding assembly 123 moves along a contoured trajectory of the guiding portion 1211. The sleeve 122 is relatively stationary with the first guiding assembly 123, thus the sleeve 122 moves relative to the guiding portion 1211. Since the guiding portion 1211 is circumferentially arranged on a guiding shaft, the guiding shaft rotates to enable the sleeve 122 to reciprocate.

In order to further understand and illustrate an axial direction of the reciprocating shaft 121, taking FIG. 1 as an example, the axial direction of the reciprocating shaft 121 is a direction indicated by any arrow on a straight line $S_1$ in FIG. 1.

In an embodiment, referring to FIGS. 1 to 4, the first guiding assembly 123 includes a first rolling member 1231 and a connecting base 1232. The first rolling member 1231 is connected to the sleeve 122 through the connecting base 1232, and the first rolling member 1231 is rollably fitted with the guiding portion 1211. In this way, the rolling fit is conducive to reducing the friction, reducing the power loss, improving the transmission efficiency of the reciprocating mechanism 120, thereby improving the use quality of the hand-held cleaning device 100.

Figure 3:
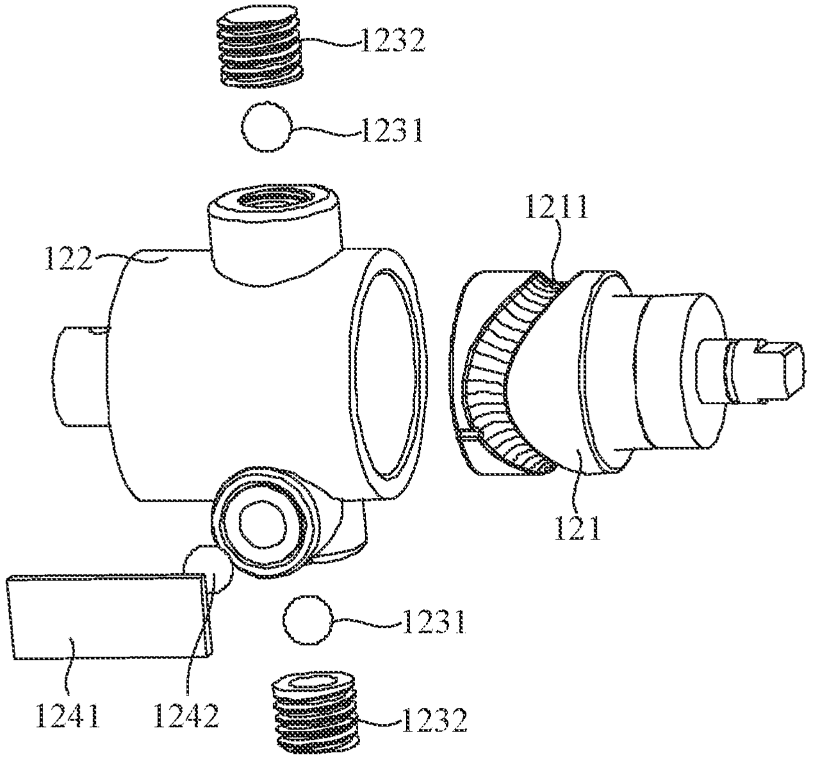
FIG. 3 is an exploded view of a reciprocating mechanism according to an embodiment.

Specifically, referring to FIG. 1 and FIG. 3, the first rolling member 1231 is a ball. The connecting base 1232 is a fixed steel ball holder. The connecting base 1232 is threadedly connected to the sleeve. Alternatively, the connecting base 1232 is secured in the sleeve 122 by a circlip. In this way, the rolling smoothness of the first rolling member 1231 is improved, the power loss is further reduced, the transmission efficiency of the transmission mechanism is improved, and the water pressure and the flow rate of the hand-held cleaning device 100 are improved under the same power.

Alternatively, the first rolling member 1231 and the connecting base 1232 are an integrated universal ball bearing. In this way, the structural stability of the first guiding assembly 123 is improved, the rolling friction between the universal ball bearing and the reciprocating shaft 121 is formed under the condition of ensuring the load, the power loss is reduced, the transmission efficiency is improved, and the water pressure and the flow rate of the hand-held cleaning device 100 are improved under the same power.

Figure 2:
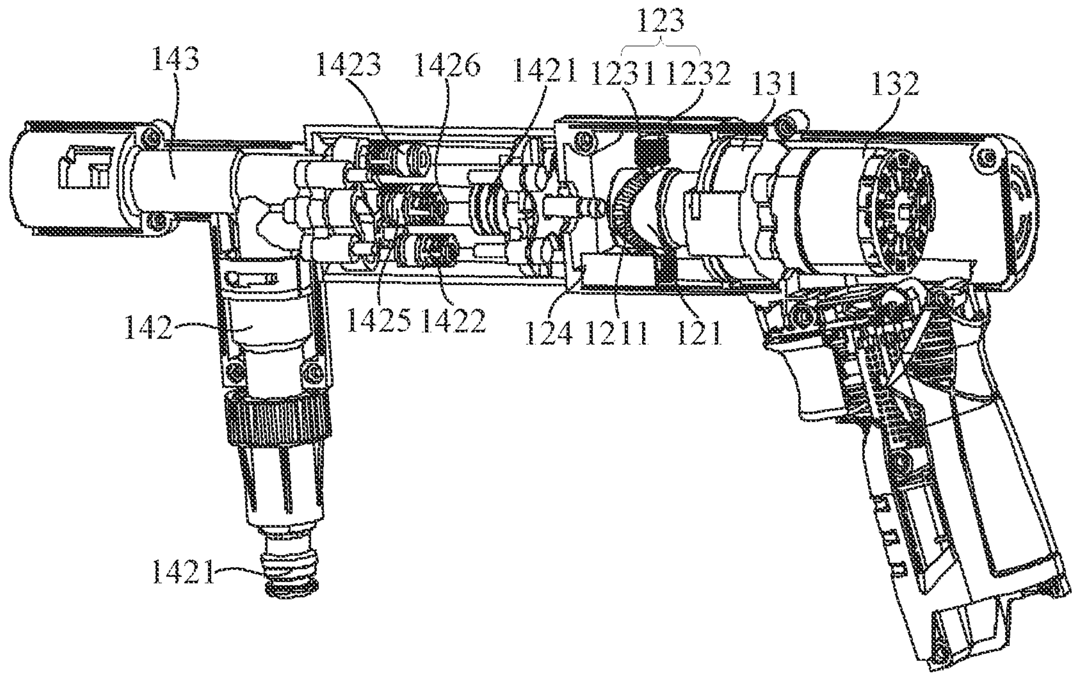
FIG. 2 is a second schematic view showing the internal structure of the hand-held cleaning device according to an embodiment.

Further, referring to FIG. 1 and FIG. 2, at least two first guiding assemblies 123 are provided, the at least two first guiding assemblies 123 are spaced apart along a circumferential direction of the reciprocating shaft 121, and the at least two first guiding assemblies 123 are rollably fitted with the guiding portion 1211.

Figure 4:
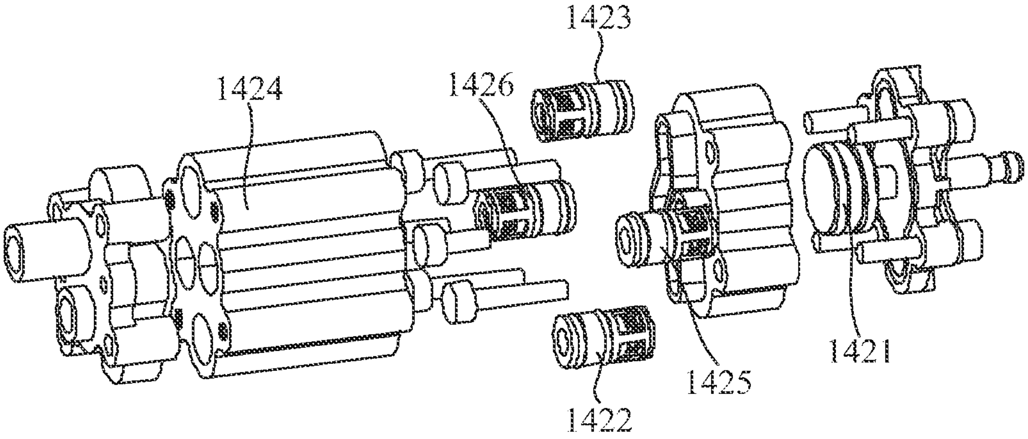
FIG. 4 is an exploded view of a pump body according to an embodiment.

Specifically, referring to FIG. 1 and FIG. 4, two first guiding assemblies 123 are provided, and the two first guiding assemblies 123 are symmetrically arranged along the axis of the reciprocating shaft 121. The two first guiding assemblies 123 are rollably fitted with the guiding portion 1211, but are not limited hereto. In this way, on the one hand, it is conducive to improving the guiding function of the first guiding assembly 123 and improving the transmission efficiency of the reciprocating mechanism 120. On the other hand, the two symmetrically arranged first guiding assemblies 123 are conducive to improving the supporting effect of the guiding assemblies on the circumferential direction of the reciprocating shaft 121, which can prevent the reciprocating shaft 121 from swinging to counteract deflection forces with each other, thus further reducing the power loss, enabling the sleeve to move more smoothly to reduce the wear, improving the use quality of the hand-held cleaning device 100.

Optionally, the guiding portion 1211 may be a guiding plate 1241, a guiding groove, a guiding tube, or other guiding structures.

Specifically, referring to FIG. 1 and FIG. 4, the guiding portion 1211 is a guiding groove extending along the circumferential direction of the reciprocating shaft 121 and extending reciprocally along the axial direction of the reciprocating shaft 121. The first rolling member 1231 is rollably fitted with the guiding groove. In this way, the first rolling member 1231 rolls along a contoured trajectory of the guiding groove, so as to drive the sleeve 122 to reciprocate, thereby improving the structural stability of the reciprocating mechanism 120, improving the transmission efficiency of the reciprocating mechanism 120, reducing the loss, and further improving the use reliability of the hand-held cleaning device 100. The embodiment provides only one specific embodiment of the guiding portion 1211, but is not limited hereto.

In an embodiment, referring to FIGS. 1 to 4, the reciprocating mechanism 120 further includes a second guiding assembly 124 connected to a cavity wall of the mounting cavity 111, and the second guiding assembly 124 is in guiding engagement with the sleeve 122. In this way, the second guiding assembly 124 is conducive to guiding the reciprocating movement of the sleeve 122, and preventing the reciprocating movement of the sleeve 122 from being track deviating to a large extent in the mounting cavity 111, which is conducive to reducing the deflection force, improving the transmission efficiency of the transmission mechanism, improving the movement stability of the water pump assembly 140, and further improving the use quality of the hand-held cleaning device 100.

Further, referring to FIGS. 1 to 4, the second guiding assembly 124 includes a guiding plate 1241 and a second rolling member 1242. The guiding plate 1241 is connected to the cavity wall of the mounting cavity 111, and the guiding plate 1241 extends along the length direction of the reciprocating shaft 121. The sleeve 122 is in guiding engagement with the guiding plate 1241 through the second rolling member 1242. In this way, it is conducive to reducing the friction between the sleeve 122 and the guiding plate 1241, improving the smoothness of the reciprocating movement of the sleeve 122, thereby improving the working stability and reliability of the water pump assembly 140.

Specifically, referring to FIGS. 1 to 4, the second rolling member 1242 is a steel ball. In this way, the rolling manner is conducive to reducing the friction, reducing the power loss, improving the transmission efficiency of the reciprocating mechanism 120 and the driving assembly 130, reducing the power loss, thereby improving the use reliability of the water pump assembly 140.

Further, the guiding plate 1241 is provided with a ball groove, and the second rolling member 1242 is rollably fitted with the guiding plate through the ball groove. In this way, it is conducive to improving the smoothness and the guidance of the second rolling member 1242 on the guiding plate 1241. At the same time, the second rolling member 1242 is prevented from falling, the working reliability of the second guiding assembly 124 is improved, so that the working stability and the reliability of the water pump assembly 140 are further improved.

In an embodiment, referring to FIGS. 1 to 4, at least two second guiding assemblies 124 are provided. The at least two second guiding assemblies 124 are spaced apart along a circumferential direction of the sleeve 122, and the at least two second guiding assemblies 124 are rollably fitted with the sleeve 122.

Specifically, referring to FIGS. 1 to 4, two second guiding assemblies 124 are provided, the two second guiding assemblies 124 are arranged on opposite sides of the sleeve 122 in the circumferential direction along opposite sides of an axis of the sleeve 122, and the two second guiding assemblies 124 are rollably fitted with the sleeve 122, but are not limited hereto. In this way, it is conducive to further improving the guiding effect and supporting effect of the second guiding assembly 124 on the reciprocating movement of the sleeve 122, preventing the reciprocating movement of the sleeve 122 from being track deviating to a large extent, improving the transmission efficiency of the reciprocating mechanism 120, thereby improving the working stability and reliability of the water pump assembly 140.

In an embodiment, referring to FIG. 1 and FIG. 2, the pump body 142 includes a plunger 1421, a first check valve 1422, a second check valve 1423, and a pump housing 1424. The plunger 1421 is connected to the sleeve 122, the first check valve 1422 is in communication between the plunger 1421 and the water inlet member 141, and the second check valve 1423 is in communication between the plunger 1421 and the water outlet member 143. The plunger 1421 is configured to discharge water from the water inlet member 141 through the first check valve 1422 and the second check valve 1423 during reciprocating movement. In this way, due to the one-way conduction effect of the check valve, when the plunger 1421 moves, water can only be sucked into the pump housing 1424 from the water inlet member 141 through the first check valve 1422, and then be discharged from the water outlet member 143 through the second check valve 1423, which is conducive to preventing water backflow, and to improving the working reliability of the water pump assembly 140.

In an embodiment, referring to FIG. 1 and FIG. 2, the pump body 142 further includes a third check valve 1425 and a fourth check valve 1426. The third check valve 1425 is in communication between the plunger 1421 and the water inlet member 141, and the third check valve 1425 is opposite in direction to the first check valve 1422. The fourth check valve 1426 is in communication between the plunger 1421 and the water outlet member 143, and the fourth check valve 1426 is opposite in direction to the second check valve 1423. In this way, when the plunger 1421 reciprocates in the pump housing 1424, it can perform work both forward and backward. When the plunger 1421 moves forward, water is sucked and discharged through the first check valve 1422 and the second check valve 1423. When the plunger 1421 moves backward, water is sucked and discharged through the third check valve 1425 and the fourth check valve 1426. Since water is continuously discharged when the plunger 1421 reciprocates, it is conducive to improving the working efficiency of the water pump assembly 140, thereby improving the water discharging quality and use experience of the hand-held cleaning device 100.

In an embodiment, referring to FIGS. 1 to 4, the driving assembly 130 includes a reduction gearbox 131 and a driving member 132 in driving connection with the reduction gearbox 131. The reduction gearbox 131 is in transmission connection with the reciprocating shaft 121. The driving member 132 drives the reduction gearbox 131 to move, thereby driving the reciprocating shaft 121 to rotate, which is conducive to adjusting a rotation speed of the reciprocating shaft 121, and adjusting a movement speed of the plunger 1421, adjusting the water pressure and flow rate of the water pump assembly 140, which is conducive to improving the stability and use quality of the hand-held cleaning device 100.

Optionally, the driving member 132 may be an electric motor, a hydraulic motor, a pneumatic motor or other driving devices.

Specifically, referring to FIGS. 1 to 4, the driving member 132 is an electric motor. In this way, it is conducive to improving the portability of the driving member 132, and facilitating the charging and carrying of the hand-held cleaning device 100 through the battery driving, thereby improving the use convenience of the hand-held cleaning device 100. The embodiment only provides a specific embodiment of the driving member 132, but is not limited hereto.

In an embodiment, referring to FIGS. 1 to 4, the driving assembly 130 further includes a transmission member 133, and the reduction gearbox 131 is in transmission connection with the driving member 132 through the transmission member 133. In this way, the driving member 132 drives the transmission member 133 to move, so as to drive the reduction gearbox 131 to move, which is conducive to improving the driving effect of the driving member 132 and prolonging the service life of the driving member 132. At the same time, different transmission manners are conducive to improving the compactness of the internal structure of the mounting cavity 111, reducing the volume and weight, thereby improving the service quality of the hand-held cleaning device 100.

Optionally, the transmission manner of the transmission member 133 may be gear transmission, belt transmission, chain transmission, linkage transmission or other transmission modes.

Specifically, referring to FIG. 1 and FIG. 2, the transmission member 133 is a gear. In this way, it is conducive to ensuring the transmission efficiency of the reciprocating mechanism 120, improving the movement stability of the reciprocating shaft 121, and improving the compactness of the internal structure of the mounting cavity 111, so as to reduce the volume and weight of the hand-held cleaning device 100, facilitating carrying, and improving the use experience of the hand-held cleaning device 100. The embodiment only provides a specific embodiment of the transmission member 133, but is not limited hereto.

In an embodiment, the water inlet member 141 is provided with a safety relief valve (not shown) that is in communication between the water inlet member 141 and the plunger 1421. In this way, it is conducive to playing a safety protection role in the water pump assembly 140. When a pressure in the pump body 142 exceeds a specified value, the safety relief valve is pushed open, and a part of the water flow out of the pump body 142 is returned to the water inlet member 141, so that the pressure in the pump body 142 is maintained within a safe value range, so as to ensure that the water pump assembly 140 is free from accidents due to excessive pressure, and effectively improve the use safety and reliability of the hand-held cleaning device 100.

In an embodiment, referring to FIG. 1 and FIG. 2, the water inlet member 141 is provided with a water inlet quick joint 1411 configured to be detachably connected to the water storage device. In this way, it is conducive to improving the connection stability between the water inlet member 141 and the water storage device, such as a water inlet quick-connection pipe and a water tank, and at the same time it is easy to disassemble, which is conducive to improving the convenience of replacing the water storage device, and improving the convenience of the hand-held cleaning device 100.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A hand-held cleaning device, comprising:

a housing provided with a mounting cavity;

a reciprocating mechanism provided in the mounting cavity, the reciprocating mechanism comprising a reciprocating shaft, a sleeve, and a first guiding assembly, wherein the sleeve is sleeved on the reciprocating shaft, the reciprocating shaft is provided with a guiding portion, and the sleeve is in guiding engagement with the guiding portion through the first guiding assembly;

a driving assembly provided in the mounting cavity, the driving assembly being in driving connection with the reciprocating shaft and configured to drive the reciprocating shaft to rotate, so as to enable the sleeve to reciprocate along an axial direction of the reciprocating shaft; and a water pump assembly comprising a water inlet member, a pump body, and a water outlet member, wherein the pump body is connected to the sleeve, the pump body is in communication between the water inlet member and the water outlet member, when the pump body moves along an axis of the reciprocating shaft, the pump body is configured to suck water from the water inlet member and discharge the water from the water outlet member.

2. The hand-held cleaning device according to claim 1, wherein the first guiding assembly comprises a first rolling member and a connecting base, the first rolling member is connected to the sleeve through the connecting base, and the first rolling member is rollably fitted with the guiding portion.

3. The hand-held cleaning device according to claim 2, wherein the guiding portion is a guiding groove extending along a circumferential direction of the reciprocating shaft and extending reciprocally along the axial direction of the reciprocating shaft, and the first rolling member is rollably fitted with the guiding groove.

4. The hand-held cleaning device according to claim 2, wherein the reciprocating mechanism further comprises a second guiding assembly connected to a cavity wall of the mounting cavity, and the second guiding assembly is in guiding engagement with the sleeve.

5. The hand-held cleaning device according to claim 4, wherein the second guiding assembly comprises a guiding plate and a second rolling member, the guiding plate is connected to the cavity wall of the mounting cavity, the guiding plate extends along a length direction of the reciprocating shaft, and the sleeve is in guiding engagement with the guiding plate through the second rolling member.

6. The hand-held cleaning device according to claim 4, wherein at least two first guiding assemblies are provided, the at least two first guiding assemblies are spaced apart along a circumferential direction of the reciprocating shaft, and the at least two first guiding assemblies are rollably fitted with the guiding portion; and/or at least two second guiding assemblies are provided, the at least two second guiding assemblies are spaced apart along a circumferential direction of the sleeve, and the at least two second guiding assemblies are rollably fitted with the sleeve.

7. The hand-held cleaning device according to claim 1, wherein the pump body comprises a plunger, a first check valve, and a second check valve, the plunger is connected to the sleeve, the first check valve is in communication between the plunger and the water inlet member, the second check valve is in communication between the plunger and the water outlet member, and when the plunger reciprocates, the plunger is configured to discharge water from the water inlet member through the first check valve and the second check valve.

8. The hand-held cleaning device according to claim 7, wherein the pump body further comprises a third check valve and a fourth check valve, the third check valve is in communication between the plunger and the water inlet member, the third check valve is opposite in direction to the first check valve, the fourth check valve is in communication between the plunger and the water outlet member, and the fourth check valve is opposite in direction to the second check valve.

9. The hand-held cleaning device according to claim 8, wherein the driving assembly comprises a reduction gearbox and a driving member in driving connection with the reduction gearbox, and the reduction gearbox is in transmission connection with the reciprocating shaft.

10. The hand-held cleaning device according to claim 9, wherein the driving assembly further comprises a transmission member, and the reduction gearbox is in transmission connection with the driving member through the transmission member.

* * * * *